Aug. 15, 1967    C. M. PERKINS    3,335,616
TWIN COUNTERSHAFT WITH FIXED MAIN SHAFT
Filed Jan. 20, 1966    3 Sheets-Sheet 1

INVENTOR.
CHARLES M. PERKINS
BY
Markham, Blanchard & Flynn
ATTORNEYS

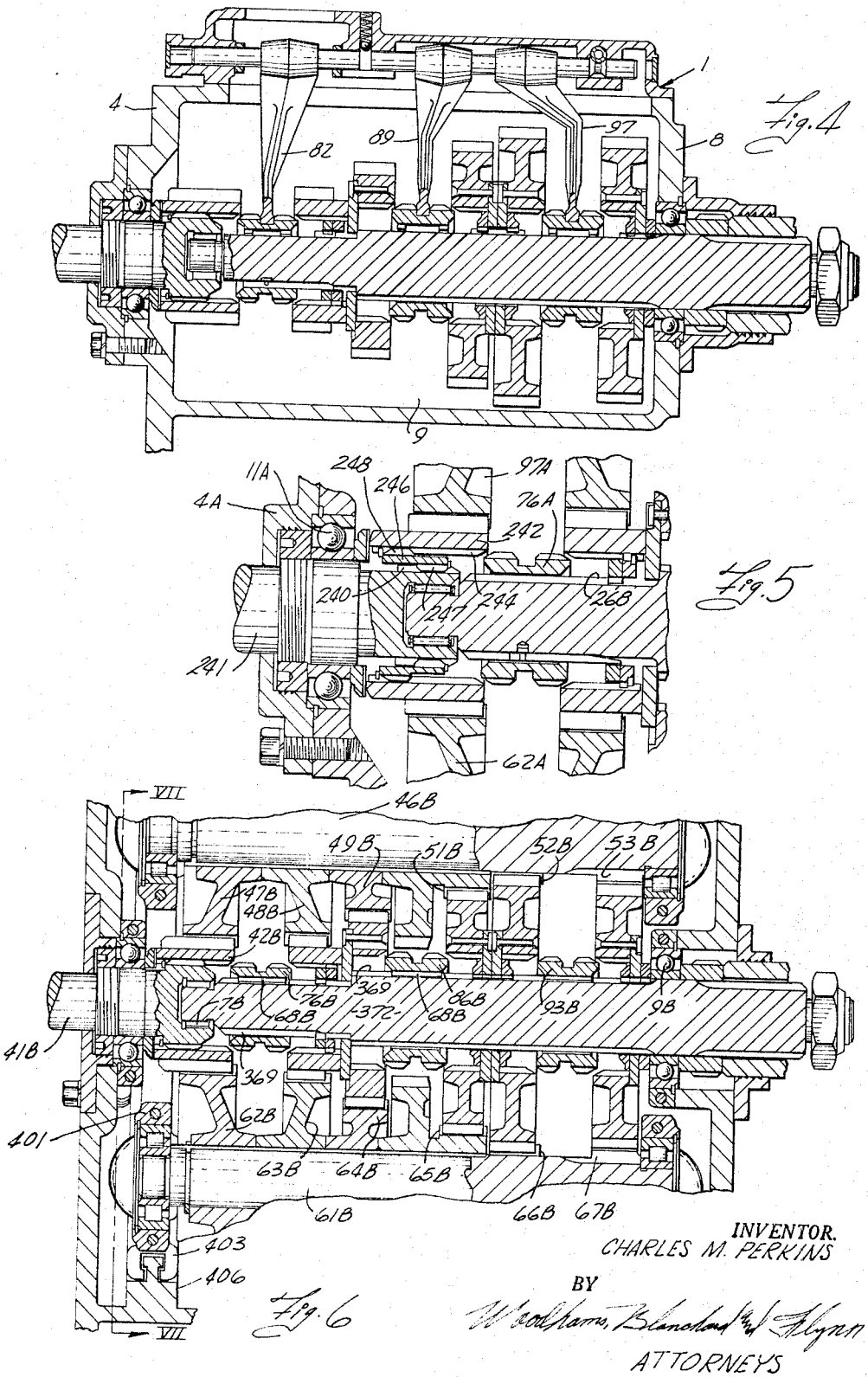

Aug. 15, 1967  C. M. PERKINS  3,335,616
TWIN COUNTERSHAFT WITH FIXED MAIN SHAFT
Filed Jan. 20, 1966  3 Sheets-Sheet 3

INVENTOR.
CHARLES M. PERKINS
BY
Woodhams, Blanchard & Flynn
ATTORNEYS

United States Patent Office 3,335,616
Patented Aug. 15, 1967

3,335,616
TWIN COUNTERSHAFT WITH FIXED MAIN SHAFT
Charles M. Perkins, Scottsdale, Ariz., assignor to Eaton Yale & Towne Inc., Cleveland, Ohio, a corporation of Ohio
Filed Jan. 20, 1966, Ser. No. 521,943
22 Claims. (Cl. 74—331)

This application is a continuation-in-part of my application Ser. No. 361,049, entitled, "Automotive Device," and assigned to the same assignee as the present application, now Patent No. 3,283,613.

This invention relates to a multicountershaft transmission and particularly to a type thereof having provision for the equalizing of torque transmission through the countershafts.

In my Patent No. 3,105,395, there has been set forth a highly effective and commercially successful system for obtaining the recognized advantages of a multicountershaft transmission while maintaining in a very simple manner equality of torque transmission through the said countershafts. The transmission set forth in this patent provides both an input shaft and the countershafts on fixed axes with the gears thereof being immovable radially with respect to the respective shafts on which they are mounted. The output shaft, however, or main shaft, is floatingly mounted for movement transverse to a plane connecting the axes of two countershafts and the main shaft gears, when unclutched therefrom, encircle the main shaft with sufficient clearance to permit movement of the main shaft radially with respect to said gears. Thus, said main shaft can move radially with respect to the gears to which it is not clutched but the gear to which said main shaft is clutched and said main shaft are radially movable as a single unit transversely with respect to the plane connecting the axes of said two countershafts in order to equalize the torque received onto said main shaft from each of such countershafts. This system works well and has received wide commercial acceptance.

However, this system has one deficiency which has prevented its application in certain instances, namely, that the floating nature of the main-shaft prevents its convenient use in those instances where a radial load is provided, such as where a shaft brake is used or where the output shaft drives a pulley or a radially positioned gear. In this connection, I am not overlooking the fact that the application of Elmer A. Richards and myself, Ser. No. 425,665, also assigned to the same assignee as the present application, utilizes a floating main shaft with an output shaft on a fixed axis. However, this requires two bearings on the output end of the transmission together with connector means between the floating shaft and the fixed-axis shaft. The necessity for such two bearings undesirably elongates the transmission and the necessity for a connection between the floating shaft and the fixed-axis shaft further complicates both the construction and maintenance of the transmission and increases the cost thereof.

Accordingly, the objects of the present invention include:

(1) To provide a multicountershaft transmission wherein the torque transmitted through said multicountershafts is automatically and continuously equalized and wherein the main shaft is mounted in fixed and widely spaced bearings whereby to carry a radial load at the output end thereof.

(2) To provide a multicountershaft transmission as aforesaid requiring only a single bearing at the output end of the main shaft of the transmission whereby to minimize the overall length thereof.

(3) To provide a multicountershaft transmission as aforesaid capable of obtaining all of the objectives set forth in my Patent No. 3,105,395 while utilizing a main shaft mounted on a fixed axis.

(4) To provide a multicountershaft transmission as aforesaid, primarily applicable to a dual countershaft arrangement wherein the unclutched ones of said main shaft gears are movable radially with respect to the main shaft while the clutched one of the main shaft gears may be or may not be radially movable with respect to said main shaft providing that radial equalizing movement is provided somewhere in the gear train between the countershaft gears on one hand and either the input or the clutched one of the main shaft gears on the other hand.

(5) To provide a dual countershaft transmission, as aforesaid, having its main shaft in fixed bearings wherein both clutched and unclutched main shaft gears are radially movable with respect to the axis of said main shaft.

(6) To provide a dual countershaft transmission, as aforesaid, wherein the input shaft, the countershafts and the main shaft are all rotatable on fixed axes, the unclutched output gears are all movable radially with respect to the axis of said main shaft and either the input gear or the clutched main shaft gear is movable transversely to the plane connecting the axes of said two countershafts.

(7) To provide a multicountershaft transmission, as aforesaid, which will have a high degree of reliability in operation but which will have low manufacturing and maintenance costs.

Other objects and purposes of the invention will be apparent to persons acquainted with apparatus of this general type upon reading the following specification and upon inspection of the accompanying drawings.

FIGURE 4 is a section taken on the line IV—IV of FIGURE 1.

FIGURE 5 is a fragmentary section corresponding to FIGURE 2 and showing a modification of the invention.

FIGURE 6 is a section corresponding to FIGURE 2 and showing a still further modification of the invention.

*General description*

In general, the invention comprises providing at least two similar countershafts and arranging same at equally spaced intervals around axially aligned input and main shafts. Sets of corresponding countershaft gears are arranged on said countershafts, the gears of each set being arranged substantially in radial alignment with each other and each set having one gear respectively on each countershaft, and annular main shaft gears are each supported between and by respective sets of such countershaft gears. A main shaft extends through said main shaft gears and is selectively clutchable to one thereof at a time for establishing a selected transmission ratio. Means are provided for permitting radial movement of a clutched main shaft gear, or the input gear, with respect to the axes of the countershaft gears. Said radial movement may be accomplished in any of several ways, such as by mounting the clutched main shaft gear through flexible coupling means to the main shaft, by mounting the input gear radially floatably with respect to the input shaft, by floatingly mounting the input shaft itself, or by mounting the countershaft gears and shafts as a single system for movement with respect to fixed-axis input and main shaft gears in a direction transverse of a plane through two countershaft axes.

*Detailed description*

Figure 1:
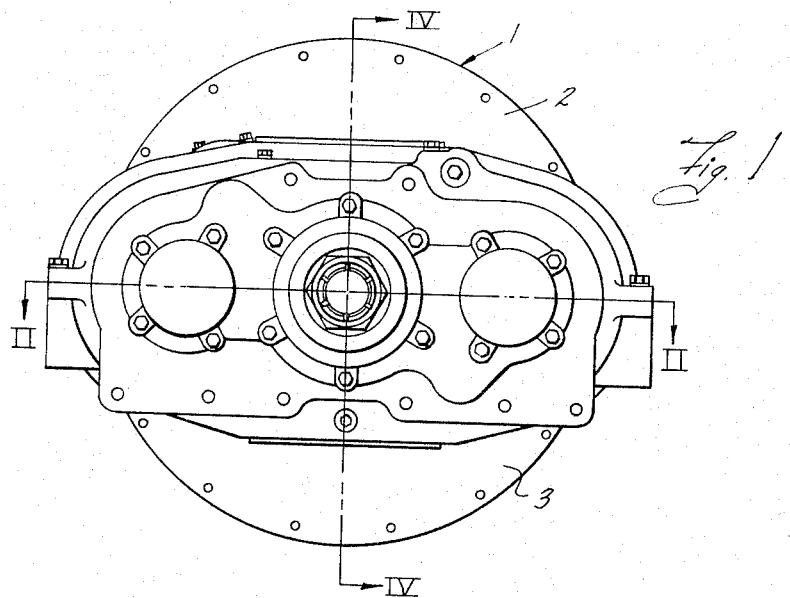
FIGURE 1 is an end view of a transmission embodying the invention.
Figure 2:
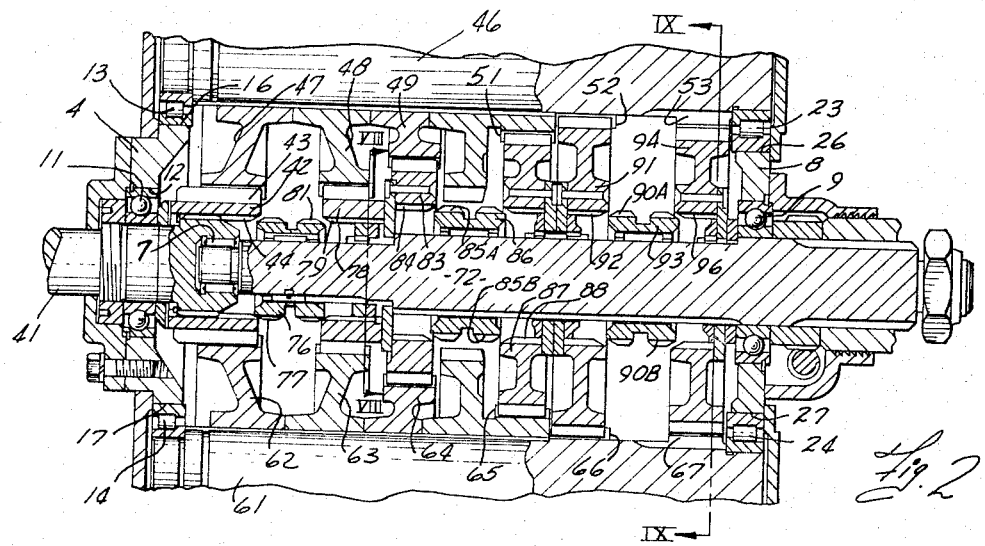
FIGURE 2 is a central section taken on line II—II of FIGURE 1 of a transmission embodying one form of the invention.

In the following description certain terminology will be used for convenience of reference but it will be understood that such terminology will be for convenience only and has no limiting significance. For example, the terms "forward" and "rearward" will refer to directions forward and rearward of the vehicle in which the transmission is installed. Thus, the leftward portion as appearing in FIGURE 2 is forward and the rightward portion of the transmission as appearing in said figure is rearward. The terms "rightward" and "leftward" will refer to directions as taken in the drawings in connection with which said terminology is used. The terms "inward" and "outward" will refer to directions toward and away from the geometric center of the apparatus. All terms mentioned foregoing include all normal derivatives and equivalents of each thereof.

Referring now to the drawings there is provided a casing 1 which is horizontally split into upper and lower portions 2 and 3, respectively. Said lower portion 3 has a forward end wall 4 and a rearward end wall 8. A suitable, depending, oil sump may be provided, if desired.

Each of said walls is provided with recesses for the reception of the various shaft bearings. The input shaft bearing 11 is supported by a suitable recess 12 in the wall 4. The countershaft bearings 13 and 14 are supported in suitable recesses 16 and 17, respectively, in said forward end wall 4. Countershaft bearings 23 and 24 are supported to recesses 26 and 27, respectively, in the rearward wall 8.

An input shaft 41 is supported in the bearing 11 and has a drive gear 42 drivingly supported on the rearward end thereof. Said drive gear has external teeth 43 and internal clutch teeth 44. A first countershaft 46 is supported by the bearings 13 and 23 and carries thereon and fixed for rotation therewith the countershaft ratio gears 47, 48, 49, 51, 52 and 53.

A second countershaft 61 is supported within the bearings 14 and 24 and is in all respects preferably identical with the first countershaft 46. Second countershaft ratio gears 62–67 are mounted on and for rotation with the second countershaft 61 and are preferably respectively identical with the ratio gears 47, 48, 49, 51, 52 and 53.

The main transmission shaft 72 is arranged substantially coaxial with the input shaft 41 and is supported on suitable fixed bearings, one of which will conveniently be the bearing 7 within the drive gear 42 and the other is the bearing 9 in the rear wall 8 of the transmission casing. Gears are provided on the main shaft for engagement with the countershaft gears and said countershaft gears and/or said main shaft gears are appropriately clutched, to each other or to their respective shafts, in any convenient manner to provide driving connections from the two countershafts through a selected pair of countershaft gears to and through the main shaft gear associated therewith to the main shaft while providing a flexible coupling between the main shaft gears and the main shaft. The particular method of clutching or flexible coupling hereinafter described will thus be recognized as illustrative only and not limiting.

Said main shaft may be utilized with, or as, the input of an auxiliary transmission or same may be connected directly, if desired, or through other means to the load being driven.

In this particular embodiment, the slider 76 is slidingly mounted on splines on the forward end of said main shaft 72 and carries clutch teeth 77 which are engageable with the clutch teeth 44 upon leftward movement of said slider 76. The gear 78 is meshed with and carried by the countershaft gears 48 and 63, and is provided with internal clutch teeth 79 for engagement with teeth 81 on the slider 76. Said slider 76 is provided with any suitable means for effecting axial movement thereof, such as by the usual grooves and a shift fork 82 (FIGURE 4).

Figure 9:
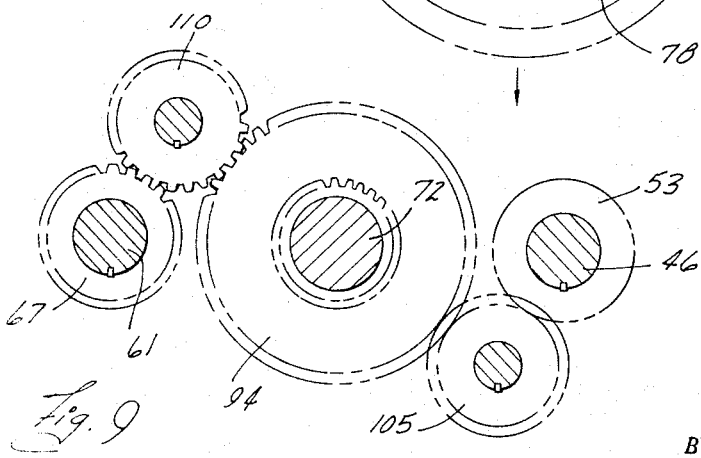
FIGURE 9 is a section taken on line IX—IX of FIGURE 2.

The main shaft gear 83 is supported between and by the countershaft gears 49 and 64 and has a set of internal clutch teeth 84 for engagement with the external teeth 85A of the slider 86. The gear 87 is supported between and by the countershaft gears 51 and 65 and is provided with internal clutch teeth 88 for engagement with the teeth 85B of the slider 86. Said slider 86 is axially sliderable for alternate, but only alternate, engagement of said clutch teeth 84 or 88 and such axial movement is effected in any convenient manner, such as by a shift fork 89 (FIGURE 4). The main shaft gear 91 is supported between and by the countershaft gears 52 and 66 and is provided with internal clutch teeth 92 for engagement of the teeth 90A of the slider 93. The main shaft gear 94 is supported on and between the usual reverse idler gears 105 and 110 (FIGURE 9) which are in turn engaged with the gears 53 and 67. The gear 94 has internal clutch teeth 96 for engagement with the teeth 90B on the slider 93 alternatively when gear 91 is not engaged with the teeth 90A. The slider 93 is arranged for axial movement by any convenient means, such as by a shift fork 97 (FIGURE 4).

Each of said gears 78, 83, 87, 91 and 94, may be collectively termed "main shaft gears," since they are all capable of driving the main shaft. However, it is emphasized that they are all supported on and by the countershaft gears and they merely surround and at times are clutched to the main shaft but are not supported on or by the main shaft.

It will be observed by inspection of FIGURE 2 that each of the main shaft gears is constantly engaged with the countershaft gears upon which it is supported. Accordingly, engagement or disengagement of a given main shaft gear with the main shaft will not affect its relationship with the countershaft gears upon and by which it is supported.

Figure 3:
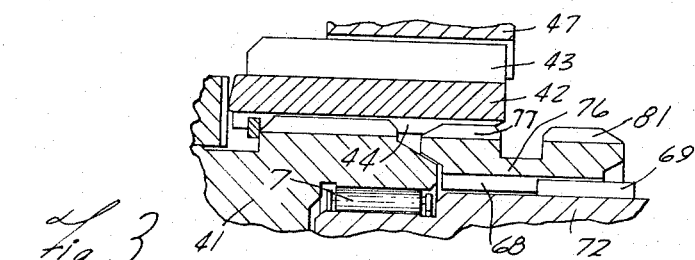
FIGURE 3 is an enlarged detail of FIGURE 2.

Each of the sliders 76, 86 and 93 is provided with internal splines, such as the spline 68 shown in enlarged scale in FIGURE 3, which cooperate with axially short splines, such as the short spline 69 shown in enlarged scale in FIGURE 3, for permitting axially rocking motion in radial direction, particularly when said sleeves are in a gear engaging position. Thus, for example, with the slider 76 in leftward gear engaging position, as shown in FIGURE 3, the gear 42 will engage the teeth 77 at the leftward end of said slider so that there is no radial motion between the gear and the leftward end of the slider but since said slider can rock on and with respect to the shaft 72 at its rearward, or rightward, end, the portion of said gear including the teeth 77 is still capable of radial movement with respect to said shaft even though drivingly connected thereto.

This reverse is true when the slider is in its rightward position, namely that the rightward end can move radially with the gear 78 while the leftward end is splined to the shaft 72. Each of the other two sliders may be similarly analyzed in their respective leftward and rightward positions. Thus, both clutched and unclutched gears may independently of each other move radially with respect to the shaft 72.

*Operation*

The operation of the apparatus has been somewhat indicated previously but will be reviewed fully to ensure a clear understanding of the invention.

Input power from the shaft 41 is supplied to the input gear 42 and is thence delivered to the countershafts 46 and 61. By suitable manipulation of one of the shift forks 82, 89 and 97 (FIGURE 4), one of the sliders connected thereto is engaged with a selected main shaft gear, such as the gear 78, and the power is then conducted from the two countershafts through such gear to the main shaft 72. The power then travels through the main shaft 72 to whatever load is connected thereto, either ultimate load or further gearing as shown in Patent No. 3,105,395.

Turning now to the relationship between the main shaft of the transmission and the countershafts it will be emphasized that the main shaft has no bearing relationship with the several main shaft gears but is only clutched to such thereof as is desired to be brought into the power-train.

The main shaft gears themselves will in their initial assembly be positioned between the countershaft gears associated therewith and will normally remain centered inasmuch as any tendency to move off said center in one direction in response to one countershaft gear is counterbalanced by an equal tendency to move in the opposite direction in response to the opposite countershaft gear. In effect, a balanced couple is created by the equal and oppositely directed forces applied to the opposite sides of the main shaft gear. This will be effective inasmuch as both of said countershafts are rigidly locked to a single input shaft and said countershafts are through said clutched main shaft gear also rigidly locked to a single output shaft.

However, if one countershaft gear, which for example may be taken as the countershaft gear 48, is irregular in shape, either within itself or as compared to the opposite countershaft gear, it may, if no compensating adjustment is made, tend to develop more pressure due to such irregularity on the associated main shaft gear 78 in an upward direction than is counterbalanced by the downwardly acting pressure from gear 63. In such case, the load torque on the main shaft gear 78 will move said main shaft gear 78 in a direction opposite to the direction in which it is being driven and thereby restore the balance between the said main shaft gear and the countershaft gears connected thereto. This may be best illustrated by reference to FIGURE 8 wherein there appears a fragment of gear 48, a schematic indication of gear 78, and a fragment of gear 63. The solid line arrows indicate the direction of rotation of each of said gears. The tendency for an increasing pressure between gear 48 and the main shaft gear 78 is indicated by the solid contact between the respectively engaged gear teeth at 161 and the tendency for a lessening pressure between interengaged teeth of gear 78 and auxiliary shaft gear 63 is indicated by the space 162 between adjacent teeth of said last-named gears. The broken line L indicates the load torque which is applied to the main shaft gear 78 by the load which said gear is driving.

Figure 8:
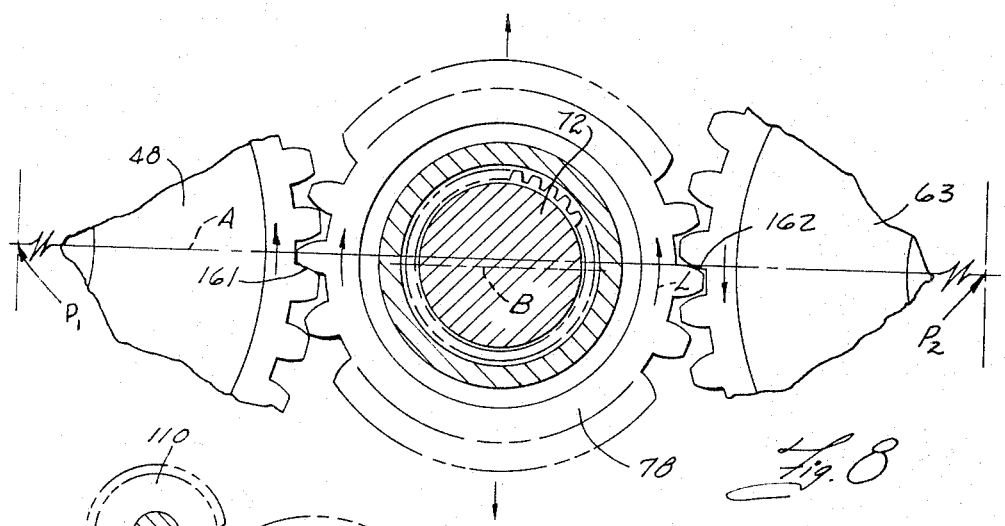
FIGURE 8 is a diagrammatic fragmentary section taken on line VIII—VIII of FIGURE 2.

It will be apparent from inspection of said FIGURE 8, and bearing in mind that gear 78 is permitted by the rocking of the slides 76 to move freely in a vertical direction even though the shaft 72 is on a fixed axis, regardless of the pressure exerted on the gear 78 at the point 161, said load torque will impose a counterclockwise acting force on said gear 78 and thereby move the rightward side of said gear upwardly until the pressure at 162 equals the pressure at 161.

If the tendency toward an unbalance occurs in the opposite direction, then the load torque will move the gear 78 downwardly to bring it again into balance with the adjacent gears 48 and 63. In FIGURE 8, line A represents the normal centering, as illustrated, of the gears 48, 78 and 63 and their associated shafts and the line B represents the center of the gear 78 when it moves downwardly as aforesaid.

This movement, and the resulting balancing of forces applied at points 161 and 162 obtained thereby, will occur very rapidly so that there is no likelihood of any appreciable unbalance occurring between the forces at the opposite contact points 161 and 162. As long as said forces remain equal, and bearing in mind that the gears 48 and 63 are in this embodiment of the same diameter and rotating at the same speeds, both the torque and the horsepower transmitted through each of the countershaft gears 48 and 63 will at all times remain equal.

In the example above given, attention was directed toward the countershaft gears 48 and 63 and the main shaft gear 78 associated therewith. It will be apparent that the same balancing effect will be obtained as the main shaft gear of each gear set becomes clutched to the main shaft.

*Modification of FIGURE 5*

In this figure, most of the parts are the same as those above described and are designated by the same numerals as used above with the letter "A" added thereto and such parts need no further description. Here, however, all of the sliders, as illustrated by the slider 76A, are mounted slideably but not rockably with respect to the shaft on which they are mounted. Each of said sliders in this embodiment is provided with internal splines which engage suitable shaft splines as the splines 268 and which latter are of length at least sufficient to provide for the full length of travel of said sliders. In such case, those of the main shaft gears which are unclutched can still move radially with respect to said main shaft in response to action thereon by the countershaft gears supporting same. However, the main shaft gear which is clutched to the main shaft is not free to follow such movement but is instead held firmly coaxial with said main shaft.

This requires, then, that the floating means be provided elsewhere by which the power between the countershafts is maintained at equality and same is in this embodiment accomplished by permitting a radial movement of the input gear with respect to the input shaft. To this end there is provided an input shaft 241 on fixed bearing 11A and carrying splines 240 thereon. A connector sleeve 246 has short internal splines 247 and short external splines 248 axially spaced from said internal splines 247. An input gear 242 has internal splines 244 thereon cooperable with said external splines 248. Said input gear is supported by and between the countershaft gears 97A and 62A but through the action of sleeve 246 is radially movable with respect to the input shaft 241 while constantly clutched thereto. The splines 240 and 248 of said input gear are preferably axially crowned to facilitate the said floating movement.

Thus, upon clutching of a desired main shaft gear by any of the sliders, such as slider 76A, the radial movability of the input gear 242 will effect the desired equalizing of torque through the countershafts and accomplish the purposes above set forth.

Figure 7:
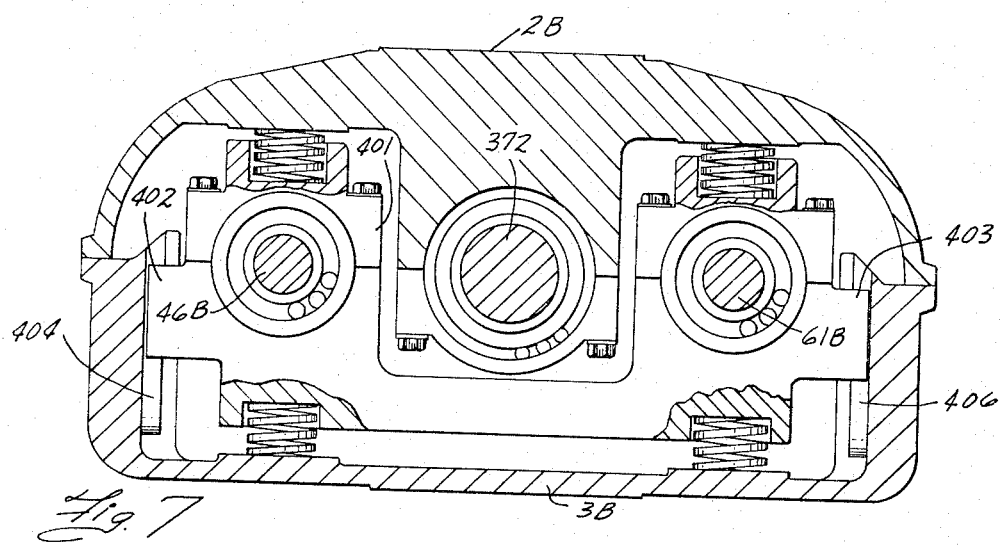
FIGURE 7 is a section taken on line VII—VII of FIGURE 6.

*Modification of FIGURES 6 and 7*

In the modification of FIGURES 6 and 7, the majority of the parts are identical with the parts above described in connection with FIGURES 1 to 4 and are identified by corresponding numerals with the letter "B" added thereto. Accordingly, no further description is needed. It will be particularly noted that here the input gear 42B is radially fixed with respect to the input shaft in the same manner as above set forth in connection with FIGURES 1 to 4. Further, the main shaft gears are radially fixed with respect to the main shaft in any convenient manner, such as by elongating the splines 369 of the shaft 372 in the same manner as above described in connection with the modification of FIGURE 5.

Here, however, the countershafts are both received into a frame structure 401 which maintains the countershafts at a fixed spacing from each other. Said frame structure is then mounted for movement with respect to the axis of both input shaft and main shaft in any convenient manner, said movement having at least a component transverse to a plane through the axes of two countershafts. In this embodiment, this is accomplished by mounting said frame 401 onto slides 402 and 403, which latter are received onto appropriately shaped rails 404 and 406 in the casing member 3B. Sufficient clearance is preferably provided between said slides and rails to permit a slight angular displacement of the countershafts as well as transverse, such displacement being also in a direction transverse to a plane connecting the axes of the countershafts. This permits both countershafts to move as a unit with respect to both the input gear and the clutched one of the output gears, whereby to obtain the same effect as in the embodiments above mentioned wherein the clutched one of said gears was permitted to move with respect to the fixed-axis countershafts. Lubrication may be provided for the slide and rail structure in any convenient manner, such as by placing them in the oil sump of the transmission housing.

It will be noted that while the shafts appearing on the leftward ends of the several figures of drawings have been referred to as the drive shafts and the shafts on the rightward ends thereof have been referred to as the main shafts, the direction of power flow through the transmission may be reversed without departing from the scope of the invention. Accordingly, the designation of said shafts in both of the foregoing description, and in the hereinafter appended claims, as input shafts and main shafts shall be recognized as for identification purposes only and shall have no limiting significance.

Other permutations, arrangements and uses within the principles above described will be apparent in the light of the foregoing and will be recognized as within the scope of the invention.

Although a particular preferred embodiment of the invention has been disclosed above for illustrative purposes, it will be understood that variations or modifications thereof which lie without the scope of the appended claims are fully contemplated.

The embodiments of the invention in which an exclusive property or privilege is claimed are defined as follows:

1. A multicountershaft transmission having means for insuring equal flow of power through each of said countershafts, comprising in combination:
   a casing;
   an input gear;
   at least two countershafts having countershaft gears fixedly mounted thereon, said countershafts being drivingly coupled to said input gear, and means for maintaining said countershafts at a constant spacing from each other;
   a plurality of annular main shaft gears between and supported by said countershaft gears;
   a main shaft extending through said main shaft gears and means supporting said main shaft for rotation about a fixed axis;
   means for clutching a selected one of said main shaft gears to said main shaft;
   first mounting means for mounting the input gear for rotation with respect to the casing, second mounting means for mounting the countershafts for rotation with respect to the casing and third mounting means for mounting the main shaft gears onto said main shaft, one of said mounting means providing for relative transverse floating movement between said countershaft gears and one of (a) said input gear or (b) a clutched one of said main shaft gears.

2. The device defined in claim 1 wherein the axes of the countershafts are fixed with respect to said casing, the clutched main shaft gear is held rigidly with respect to the main shaft and the input gear is mounted for movement radially with respect to said casing.

3. The device defined in claim 1 wherein the axes of said countershafts are mounted rigidly with respect to said casing and said first mounting means is arranged for holding the axis of said input gear fixed with respect to said casing and the third mounting means provides for radial movement of the clutched one of the main shaft gears with respect to the axis of the main shaft.

4. In a change gear system, the combination comprising:
   a plurality of spaced countershafts having parallel axes and means supporting said countershafts for rotation;
   countershaft gears concentrically supported upon said countershafts;
   a rotatable shaft arranged substantially parallel with said countershafts and located between a pair of said countershafts;
   support means rotatable on an axis fixed with respect to the axes of said countershafts and telescoped with said rotatable shaft, rotatable therewith and supporting same to permit movement of at least a portion of said rotatable shaft with respect to said countershafts in a direction transversely of a plane through the axes of said pair of countershafts;
   a rotatable gear encircling said rotatable shaft and being free to float radially with respect to said support means, said rotatable gear being simultaneously meshed with countershaft gears on each of said countershafts and being supported thereby for rotational movement about the rotational axis of said support means; and
   clutching means for effecting driving connections between said countershafts and said support means through said countershaft gears, said rotatable gear and said rotatable shaft.

5. The device defined in claim 4 wherein said rotatable shaft is a sleeve which is nonrotatably engaged with said support means at a first portion thereof and is nonrotatably engaged with said rotatable gear at a second portion thereof, said second portion being axially spaced from said first portion, whereby the axis of said rotatable shaft can move angularly with respect to the axis of said support means to permit radial movement of said second portion thereof with said rotatable gear while permitting the first portion thereof to remain rotatable about the fixed axis of said rotatable support means.

6. The device defined in claim 4 wherein said rotatable shaft is a sleeve which is nonrotatably engaged, through mating sets of first splines of which at least one set is relatively short, with said support means at a first portion thereof and is nonrotatably engaged, through mating sets of second splines of which at least one set is relatively short, with said rotatable gear at a second portion thereof, said first splines being axially spaced from said second splines whereby the axis of said rotatable shaft can move angularly with respect to the axis of said support means to permit radial movement of said second portion thereof with said rotatable gear while permitting the first portion thereof to remain rotatable about the fixed axis of said rotatable support means.

7. The device defined in claim 4 wherein:
   said support means is a rotatable shaft mounted for rotation about an axis which is fixed with respect to the axes of said countershafts, said rotatable shaft having external shaft splines thereon;
   wherein said rotatable shaft is a sleeve telescoped about said support means and being in splined relation thereto, said sleeve having internal splines at one point thereon which engage the splines on said support means, said internal splines and said external shaft splines being so related to each other as to permit angular movement of the axis of said sleeve with respect to the axis of said support means while maintaining a solid torque transmitting connection between said sleeve and said support means and said sleeve further having external sleeve splines at a point thereon axially spaced from said internal splines;
   said rotatable gear being engageable with said external sleeve splines to effect engagement in nonrotatable relationship between said sleeve and said rotatable gear, the connection between said sleeve and said gear being such as to permit angular movement between the axis of said sleeve and the axis of said gear;

whereby said sleeve can rock with respect to said support means for permitting radial movement of said gear with respect to said support means while maintaining a solid torque transmitting connection between said gear and said sleeve and between said sleeve and said support means.

8. A multicountershaft transmission comprising in combination:
an input shaft, an input gear rotatably associated therewith and first connecting means supporting said input gear on said input shaft;
at least two countershafts mounted with their axes fixed with respect to each other and with respect to the axis of said input shaft;
a plurality of countershaft gears fixedly mounted in opposed sets on said countershafts, one of said sets engaging said input gear;
a plurality of annular main shaft gears, each supported respectively between a set of opposed countershaft gears;
a main shaft extending through said main shaft gears and means mounting said main shaft for rotation about an axis fixed with respect to said countershaft axes, each of said main shaft gears encircling said main shaft and being movable radially with respect thereto;
second connecting means for selectively clutching one of said main shaft gears to said main shaft;
one of said first and second connecting means being flexible to permit relative radial movement between the gear and the shaft associated therewith.

9. The device defined in claim 8 wherein said first connecting means comprises solid and integral means between said input gear and said input shaft and said second connecting means comprises a sleeve externally splined to the internal walls of a selected one of said main shaft gears and internally splined to said main shaft, said splining benig of such character as to permit relative radial movement between said main shaft gear and said main shaft.

10. The device defined in claim 8 wherein said first connecting means comprises a flexible connection permitting radial movement between said input gear and said input shaft and said second connecting means comprises a clutch which when disconnected permits the main shaft gear with which same is associated to move radially with respect to said main shaft and which when connected fixes said main shaft gear concentrically and relatively immovably with respect to said main shaft.

11. The device defined in claim 1 wherein said second mounting means includes frame structure for rotatably mounting said countershafts at a fixed spacing with respect to each other and includes also means permitting floating movement of said frame structure with respect to said casing in a direction transverse to a plane through said countershaft axes, and wherein said first mounting means is arranged for holding the axis of the input gear fixed with respect to said casing and the third mounting means holds the clutched main shaft gear rigidly with respect to the main shaft while permitting relative movement in at least said direction of the unclutched main shaft gears with respect to said main shaft.

12. In a change gear system, the combination comprising:
a plurality of spaced countershafts having parallel axes and means supporting said countershafts for rotation;
countershaft gears supported on said countershafts;
a rotatable shaft arranged substantially parallel with said countershafts and located therebetween and bearing means supporting said rotatable shaft for rotation and holding same against movement in a radial direction;
a rotatable gear encircling said rotatable shaft and being free to float radially with respect to said rotatable shaft, said rotatable gear being meshed with said countershaft gears and being supported thereby for rotational movement with respect to the rotational axis of said rotatable shaft;
clutching means for clutching said rotatable gear to said rotatable shaft, said clutching means being at least in part radially movable with respect to said rotatable shaft so that it is capable of clutching said rotatable gear to said rotatable shaft even though the rotational axis of said rotatable gear shifts toward and away from the rotational axis of said rotatable shaft.

13. A change gear system according to claim 12 in which the clutching means comprises a sleeve splined over part of its length to said rotatable shaft so that it is capable of rocking about an axis transverse to the rotational axis of said rotatable shaft.

14. A shaft and gear arrangement comprising:
a rotatable shaft held against radial movement;
a gear encircling said shaft and being movable radially with respect thereto;
a clutch for selectively clutching said gear to said shaft, said clutch including radially movable parts movable into driving engagement with said gear while simultaneously remaining in driving engagement with said shaft so that said gear can be clutched to said shaft even though its rotational axis moves radially with respect to the axis of said shaft.

15. A change-speed gear transmission comprising:
a plurality of spaced countershafts having parallel axes and means supporting said countershafts for rotation;
a plurality of sets of countershaft gears mounted on said countershafts, each set comprising one gear on each of the countershafts and the gears of each set being substantially identical;
drive means for rotating said countershafts at substantially identical speeds and in the same direction;
a rotatable main shaft arranged substantially parallel with said countershafts and located therebetween and means supporting said main shaft for rotation about a fixed axis;
a plurality of drive gears, each drive gear being adapted to be meshed with a set of countershaft gears;
clutching means for selectively establishing a driving connection between said countershafts and said main shaft through a set of countershaft gears and a drive gear;
the drive system for each speed ratio setting of said transmission comprising the components (1) said drive means, (2) said countershafts, (3) a set of countershaft gears, (4) a drive gear and (5) the clutching means for establishing said given speed ratio, including at least one component which is mounted for relative transverse movement with respect to the components drivingly engaged therewith to equalize the torque transmitted from said countershafts to said main shaft.

16. A change-speed gear transmission according to claim 15, in which said drive means is an input gear meshed with a set of countershaft gears, an input shaft for driving said input gear and means mounting said input gear for transverse floating movement with respect to said input shaft and said set of countershaft gears.

17. A change-speed transmission according to claim 15, in which said sets of countershaft gears are fixed to said countershafts; and in which said drive gears encircle said main shaft, are free to move radially with respect thereto and are supported by said sets of countershaft gears; and in which said clutching means is associated with said drive gears for selectively clutching same to said main shaft, said clutching means being capable of permitting radial movement of the drive gear which is clutched to said main shaft while maintaining a driving connection from the clutched drive gear to said main shaft.

18. A change-speed gear transmission according to claim 15, in which said sets of countershaft gears are fixed to said countershafts, said means supporting said countershafts are arranged to permit transverse movement of said countershafts with respect to the axis of said main shaft, said drive gears are free to move radially with respect to said main shaft and said clutching means are associated with said drive gears for selectively clutching same to said main shaft.

19. A change-speed gear transmission comprising:
a plurality of spaced countershafts having parallel axes and means supporting said countershafts for rotation;
a plurality of sets of countershaft gears mounted on said countershafts, each set comprising one gear on each of the countershafts and the gears of each set being substantially identical;
drive means for rotating said countershafts at substantially identical speeds and in the same direction, said drive means comprising an input gear meshed with a set of countershaft gears, an input shaft for driving said input gear and means mounting said input gear for transverse floating movement with respect to said input shaft and said set of countershaft gears to equalize the torque transmitted from said input shaft to said countershafts;
a rotatable main shaft arranged substantially parallel with said countershafts and located therebetween and means supporting said main shaft for rotation;
a plurality of drive gears, each drive gear being adapted to be meshed with a set of countershaft gears; and
clutching means for selectively establishing a driving connection between said countershafts and said main shaft through a set of countershaft gears and a drive gear.

20. A change-speed gear transmission comprising:
a plurality of spaced countershafts having parallel axes and means supporting said countershafts for rotation;
a plurality of sets of countershaft gears mounted on said countershafts, each set comprising one gear on each of the countershafts and the gears of each set being substantially identical;
drive means for rotating said countershafts at substantially identical speeds and in the same direction;
a rotatable main shaft arranged substantially parallel with said countershafts and located therebetween and means supporting said main shaft for rotation;
means supporting said countershafts for transverse movement with respect to a plane passing through the axes of said countershafts;
a plurality of drive gears, each drive gear being adapted to be meshed with a set of countershaft gears; and
clutching means for selectively establishing a driving connection between said countershafts and said main shaft through a set of countershaft gears and a drive gear.

21. A multicountershaft transmission having means for insuring equal flow of power through each of the countershafts, comprising:
a casing;
an input gear and first mounting means for mounting said input gear for rotation with respect to said casing about a fixed axis;
at least two spaced countershafts and second mounting means for mounting said countershafts for rotation with respect to said casing about fixed parallel axes, said countershafts having a plurality of sets of substantially identical countershaft gears fixedly mounted thereon, the gears of one of said sets being drivingly coupled to said input gear so that said countershafts can be simultaneously rotated at the same speed and in the same direction;
a plurality of annular main shaft gears, each main shaft gear being positioned between and meshed with a set of countershaft gears and being supported thereby;
a main shaft extending loosely through the central openings of said main shaft gears so that said main shaft gears can move transversely with respect to said main shaft; and
clutching means for alternatively clutching said main shaft gears to said main shaft, said clutch means including means capable of providing for radial movement of the clutched one of the main shaft gears with respect to the axis of said main shaft while maintaining a driving connection between said clutched main shaft gear and said main shaft.

22. A change-speed gear transmission comprising:
a plurality of spaced countershafts having parallel axes and means supporting said countershafts for rotation;
a plurality of sets of countershaft gears fixedly mounted on said countershafts, each set comprising one gear on each of the countershafts and the gears of each set being substantially identical;
drive means for rotating said countershafts at substantially identical speeds and in the same direction;
a rotatable main shaft arranged substantially parallel with said countershafts and located therebetween, and means supporting said main shaft for rotation about a fixed axis;
a plurality of drive gears encircling said main shaft and being free to move radially with respect thereto, each drive gear being meshed with and supported by a set of countershaft gears; and
clutching means for selectively clutching one of said drive gears at a time to said main shaft, said clutching means being capable of permitting radial movement of the drive gear which is clutched to said main shaft while maintaining a driving connection from the clutched drive gear to said main shaft.

References Cited

UNITED STATES PATENTS 3,105,395 10/1963 Perkins _____ 74—745
3,237,472 3/1966 Perkins et al. _____ 74—410

DONLEY J. STOCKING, *Primary Examiner.*

DAVID J. WILLIAMOWSKY, *Examiner.*

H. S. LAYTON, *Assistant Examiner.*